United States Patent
Geng et al.

(10) Patent No.: US 9,870,265 B2
(45) Date of Patent: Jan. 16, 2018

(54) PRIORITIZING CLOUD-BASED COMPUTING TASKS ACCORDING TO GLOBAL COMPANY AND JOB TYPE PRIORITY LEVELS

(71) Applicants: Mao Geng, Foster City, CA (US); Yukching Leung, Palo Alto, CA (US); Ming Zhang, Shanghai (CN); Fan Wang, Shanghai (CN)

(72) Inventors: Mao Geng, Foster City, CA (US); Yukching Leung, Palo Alto, CA (US); Ming Zhang, Shanghai (CN); Fan Wang, Shanghai (CN)

(73) Assignee: SUCCESSFACTORS, INC., South San Francisco, CA (US)

( * ) Notice: Subject to any disclaimer, the term of this patent is extended or adjusted under 35 U.S.C. 154(b) by 197 days.

(21) Appl. No.: 14/565,255

(22) Filed: Dec. 9, 2014

(65) Prior Publication Data
US 2016/0162331 A1    Jun. 9, 2016

(51) Int. Cl.
*G06F 9/50* (2006.01)
(52) U.S. Cl.
CPC .... *G06F 9/5027* (2013.01); *G06F 2209/5021* (2013.01)
(58) Field of Classification Search
None
See application file for complete search history.

(56) References Cited

U.S. PATENT DOCUMENTS

| | | | |
|---|---|---|---|
| 5,745,778 A | 4/1998 | Alfieri | |
| 6,205,150 B1 | 3/2001 | Ruszczyk | |
| 7,111,006 B2 * | 9/2006 | Vange | G06F 9/5027 |
| 7,877,750 B2 | 1/2011 | Agiwal | |
| 7,904,192 B2 | 3/2011 | Chua et al. | |
| 8,006,003 B2 | 8/2011 | Lehr et al. | |
| 8,347,291 B2 | 1/2013 | Marwinski | |
| 8,458,712 B2 | 6/2013 | Chan et al. | |
| 8,615,677 B2 | 12/2013 | Barsness et al. | |
| 8,719,833 B2 | 5/2014 | Schmidt | |
| 8,738,414 B1 | 5/2014 | Nagar et al. | |
| 8,776,067 B1 * | 7/2014 | Yancey | G06Q 30/00 |
| | | | 707/705 |
| 2006/0193006 A1 | 8/2006 | Lawrence et al. | |
| 2007/0061180 A1 | 3/2007 | Offenberg | |

(Continued)

*Primary Examiner* — Meng An
*Assistant Examiner* — Michael Ayers
(74) *Attorney, Agent, or Firm* — Fountainhead Law Group P.C.

(57) ABSTRACT

Systems and methods for prioritizing cloud-based computing tasks are provided. An example method includes, identifying a first plurality of service requests submitted by a plurality of users including a first user; selecting a first service request, in the plurality of service requests, in accordance with a first priority, where the first service request is submitted by the first user; selecting a second service request submitted by the first user, in a second plurality of service requests submitted by the first user, in accordance with a second priority, where the second service request is associated with a first job type; and selecting a third service request submitted by the first user, in a third plurality of service requests submitted the first user, in accordance with a third priority, where the third plurality of service requests submitted the first user are associate with a same job type.

13 Claims, 5 Drawing Sheets

(56) References Cited

U.S. PATENT DOCUMENTS

| | | | |
|---|---|---|---|
| 2009/0044189 A1* | 2/2009 | Mutlu | G06F 9/4881 718/102 |
| 2011/0246434 A1* | 10/2011 | Cheenath | G06F 17/3038 707/703 |
| 2013/0254407 A1 | 9/2013 | Pijewski et al. | |
| 2014/0019980 A1 | 1/2014 | George et al. | |
| 2014/0201752 A1 | 7/2014 | Agrawal et al. | |

* cited by examiner

300

US 9,870,265 B2

PRIORITIZING CLOUD-BASED COMPUTING TASKS ACCORDING TO GLOBAL COMPANY AND JOB TYPE PRIORITY LEVELS

BACKGROUND

The present disclosure relates to computing and data processing, and in particular, to prioritizing cloud-based computing tasks.

Prioritizing cloud-based computing tasks is important. For example, a multi-tenancy cloud computing system often needs to simultaneously arrange, for execution, a large number of jobs (also referred to herein as service requests or computing tasks) submitted by several different client devices Important or urgent service requests sometimes deserve a shorter turnaround time than their less important counterparts. Also, performance conscious customers sometimes demand a quicker response than those that are less so.

Difficulties abound, however. One technical problem is that, absent a predefined prioritization policy, cloud resources are sometime not allocated judiciously, e.g., to the jobs that most need it, resulting in service deprivation to critical jobs. For example, without a predefined prioritization policy, a high priority job may not receive execution time in a timely fashion, resulting in prolonged response time, cloud performance deficiency, and ultimately customer dissatisfaction.

There is therefore a need for improved techniques to prioritize cloud-based computing tasks.

SUMMARY

In one embodiment, a computer-implemented method identifies, at a computer system having one or more processors and memory storing one or more programs for execution by the one or more processors, a first plurality of service requests submitted by a plurality of users including a first user. The method then selects a first service request, in the plurality of service requests, in accordance with a first priority. The first service request is submitted by the first user. The method then also selects a second service request submitted by the first user, in a second plurality of service requests submitted by the first user, in accordance with a second priority. The second service request is associated with a first job type. The method next selects a third service request submitted by the first user, in a third plurality of service requests submitted by the first user, in accordance with a third priority. The third plurality of service requests submitted by the first user are associate with a same job type.

In another embodiment, a non-transitory computer readable storage medium stores one or more programs comprising instructions for: identifying a first plurality of service requests submitted by a plurality of users including a first user; selecting a first service request, in the plurality of service requests, in accordance with a first priority; selecting a second service request submitted by the first user, in a second plurality of service requests submitted by the first user, in accordance with a second priority; and selecting a third service request submitted by the first user, in a third plurality of service requests submitted the first user, in accordance with a third priority. The first service request is submitted by the first user, the second service request is associated with a first job type, and the third plurality of service requests submitted by the first user are associate with a same job type.

In another embodiment, a computer implemented system comprises one or more computer processors memory; and one or more programs. The one or more programs are stored in the memory and configured to be executed by the one or more processors. The one or more programs include instructions for: identifying a first plurality of service requests submitted by a plurality of users including a first user; selecting a first service request, in the plurality of service requests, in accordance with a first priority; selecting a second service request submitted by the first user, in a second plurality of service requests submitted by the first user, in accordance with a second priority; and selecting a third service request submitted by the first user, in a third plurality of service requests submitted the first user, in accordance with a third priority. The first service request is submitted by the first user, the second service request is associated with a first job type, and the third plurality of service requests submitted by the first user are associate with a same job type.

The following detailed description and accompanying drawings provide a better understanding of the nature and advantages of the present disclosure.

DETAILED DESCRIPTION

Figure 1:
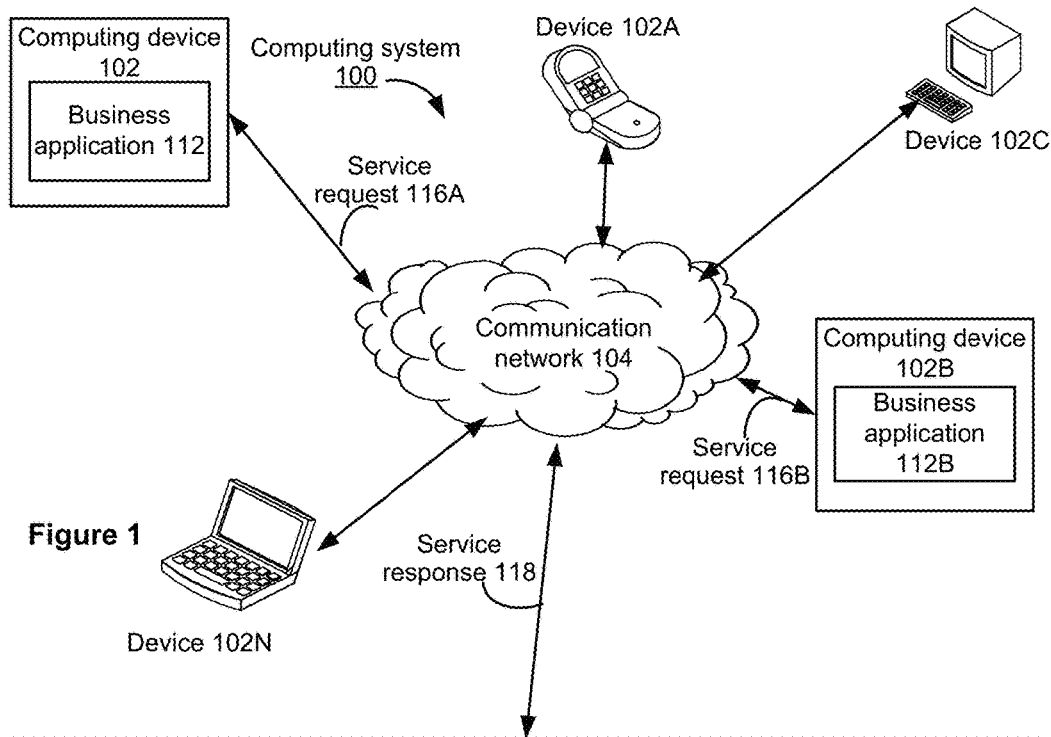
FIG. 1 is an example block diagram illustrating a computing system for prioritizing cloud-based computing tasks in accordance with one embodiment.
Figure 1:
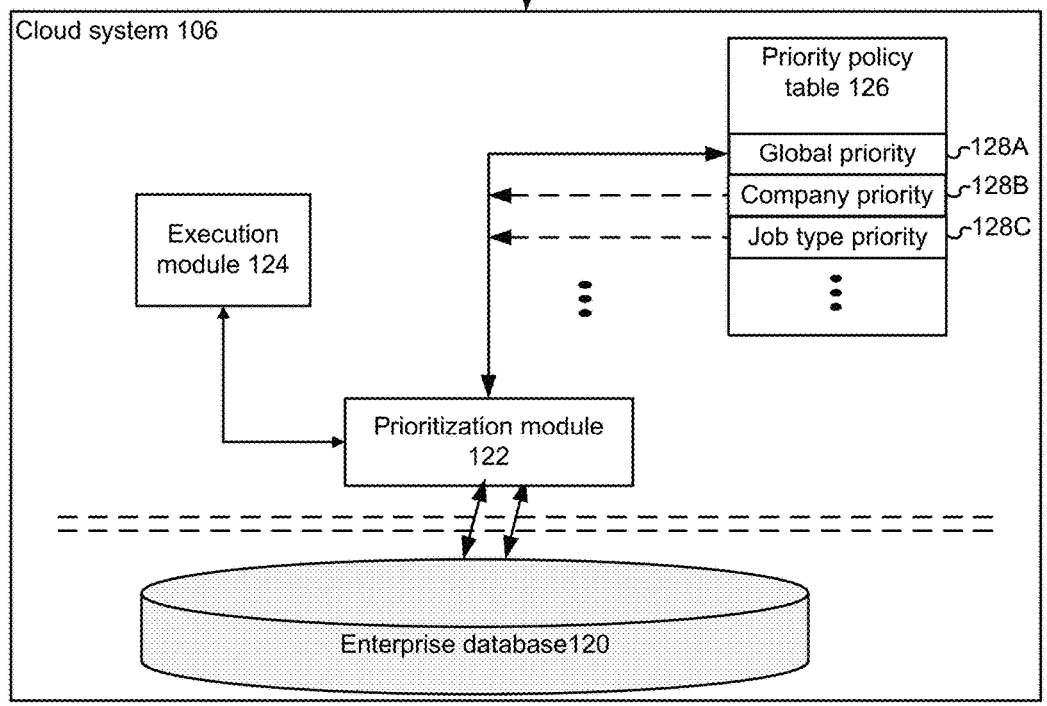

Described herein are techniques for prioritizing cloud-based computing tasks. The apparatuses, methods, and techniques described below may be implemented as a computer program (software) executing on one or more computers. The computer program may further be stored on a non-transitory computer readable medium, such as a memory or disk, for example. A computer readable medium may include instructions for performing the processes described below. In the following description, for purposes of explanation, numerous examples and specific details are set forth in order to provide a thorough understanding various aspects of the present disclosure. It will be evident, however, to one skilled in the art that embodiments of the present disclosure as defined by the claims may include some or all of the features in these examples alone or in combination with other features described below, and may further include modifications and equivalents of the features and concepts described herein.

The embodiments described herein provide various technical solutions to prioritize cloud-based computing tasks, and in particular to the above-identified technical problems. One example set forth below may use a prioritization hierarchy having several different levels of priorities, such as a global priority, a company level priority, and a job type priority, and prioritize jobs for execution in accordance with one or more of these priorities.

Introductory Example

As a non-limiting example, after receiving multiple jobs from several different customers, a cloud system may use a global priority (e.g., assigned automatically or manually by a cloud operator) to determine which jobs should receive a first step consideration for execution time.

Next, when a job with the highest global priority from customer A is selected, all jobs submitted by customer A are then examined in accordance with a company level priority (e.g., also assigned by the cloud operator) for a second step consideration for execution time.

Furthermore, when a job having a particular job type (e.g., a read request) with the highest company level priority from customer A is selected, all jobs having the same job type (e.g., other read requests) from customer A are examined in accordance with a job type priority (e.g., assigned by the customer A), and the job having the highest job type priority, among these jobs, is ultimately selected for immediate execution.

By these ways, each cloud customer can receive a fair chance of executing their high priority jobs, and each job from a particular cloud customer can receive a fair chance of execution. Also, because global priority and company level priority might be determined by a cloud operation team, a cloud operator can prioritize jobs submitted by different customers, thereby providing more supplier-side flexibility to cloud operators. Furthermore, because job type priority might be determined by a customer, each cloud customer can prioritize their own jobs based on their specific needs, thereby providing more consumer-side flexibility to cloud customers.

Additional Details of Embodiments

Additional details of embodiments are now described in relation to the figures.

FIG. 1 is an example block diagram illustrating a computing system 100 for prioritizing cloud-based computing tasks in accordance with one embodiment.

In one embodiment, the computing system 100 includes one or more computing devices 102 (e.g., 102A, 102B, 102C, . . . , and 102-N), a communication network 104, and a cloud system 106.

In one embodiment, a computing device 102 enables a user to interact with one or more business applications resident thereon, which in turn communicate with a cloud system 106 and an enterprise database 120 resident thereon, for example.

In one embodiment, the computing device 102 obtains user requests in a business application 112 and transmits the user requests to the cloud system 106 for execution. In one embodiment, the computing device 102 is a mobile computing device, such as a laptop computer, a notebook computer, a smart phone, or a tablet computer. In one embodiment, a computing device 102 is a light weight client device (also referred to herein as a client). In one embodiment, the business application 112 is a smart phone app.

In one embodiment, the business application 112 is an enterprise resource planning (ERP) application, an enterprise access control application, an enterprise access control and violation management application, a regulation management application, an enterprise process control management, an enterprise fraud detection management application, an enterprise risk management application, an enterprise data processing (EDP) application, an enterprise travel planning and expense reimbursement application, an enterprise data management (EDM) application, or an enterprise feedback management (EFM) application.

In one embodiment, the communication network 104 interconnects one or more computing devices 102 with each other and with the cloud system 106. In one embodiment, the communication network 104 optionally includes the Internet, one or more local area networks (LANs), one or more wide area networks (WANs), other types of networks, or a combination of such networks.

In one embodiment, the cloud system 106 provides service responses 118 responsive to one or more service requests 116A and 116B, e.g., received from one or more computing devices 102 or customers. In one embodiment, the cloud system 106 is a computing cloud (or a portion thereof) that processes service requests from a plurality of computing devices 102, e.g., mobile or otherwise, and provides service responses thereto.

In one embodiment, the cloud system 106 includes a prioritization module 122, an execution module 124, a priority policy table 126, and an enterprise database 120.

In one embodiment, the prioritization module 122 selects a job, from a plurality of jobs, for consideration for execution, based on a priority hierarchy that specifies one or more priority levels. For example, after selecting a job with the highest global priority from customer A, the prioritization module 122 examines all jobs submitted by the customer A in accordance with a company level priority.

For another example, after selecting a job with the highest company level priority submitted by customer A, the prioritization module 122 examines all jobs having the same job type, e.g., other read requests, from the customer A in accordance with a job type priority and selects one of these jobs for immediate execution.

In one embodiment, the execution module 124 executes a job responsive to a request for execution by the prioritization module 122. For example, when selected by the execution module 124, a job receives immediate CPU time and network bandwidth for execution by the cloud system 106.

In one embodiment, the priority policy table 126 manages one or more levels of priorities associated with one or more jobs submitted (by one or more computing devices) to the cloud system 106 for execution. For example, every job submitted to the cloud system 106 is assigned, by either a cloud operator or a cloud customer, a global priority 128A, a company priority 128B, and a job type priority 128C.

In one embodiment, the enterprise database 120 manages data stored thereon in accordance with user requests, e.g., updating a data table in accordance with a write request or providing data responsive to a read request. In one embodiment, the enterprise database 120 includes one or more databases. In one embodiment, the enterprise database 120 stores and manages data for one or more business (e.g., enterprise) applications. In one embodiment, the enterprise database 120 stores business data, such as sales/business expenses/revenues, customer profiles, and supplier profiles.

In one embodiment, the enterprise database system 120 is implemented using in-memory computing techniques, where data are stored in the main random access memory (RAM) of dedicated servers. These techniques may be advantageous, as in-memory computing helps enterprise/business customers, such as retailers, banks, and utilities, to quickly detect patterns, analyze massive data volumes on the fly, and perform their operations quickly.

Figure 2:
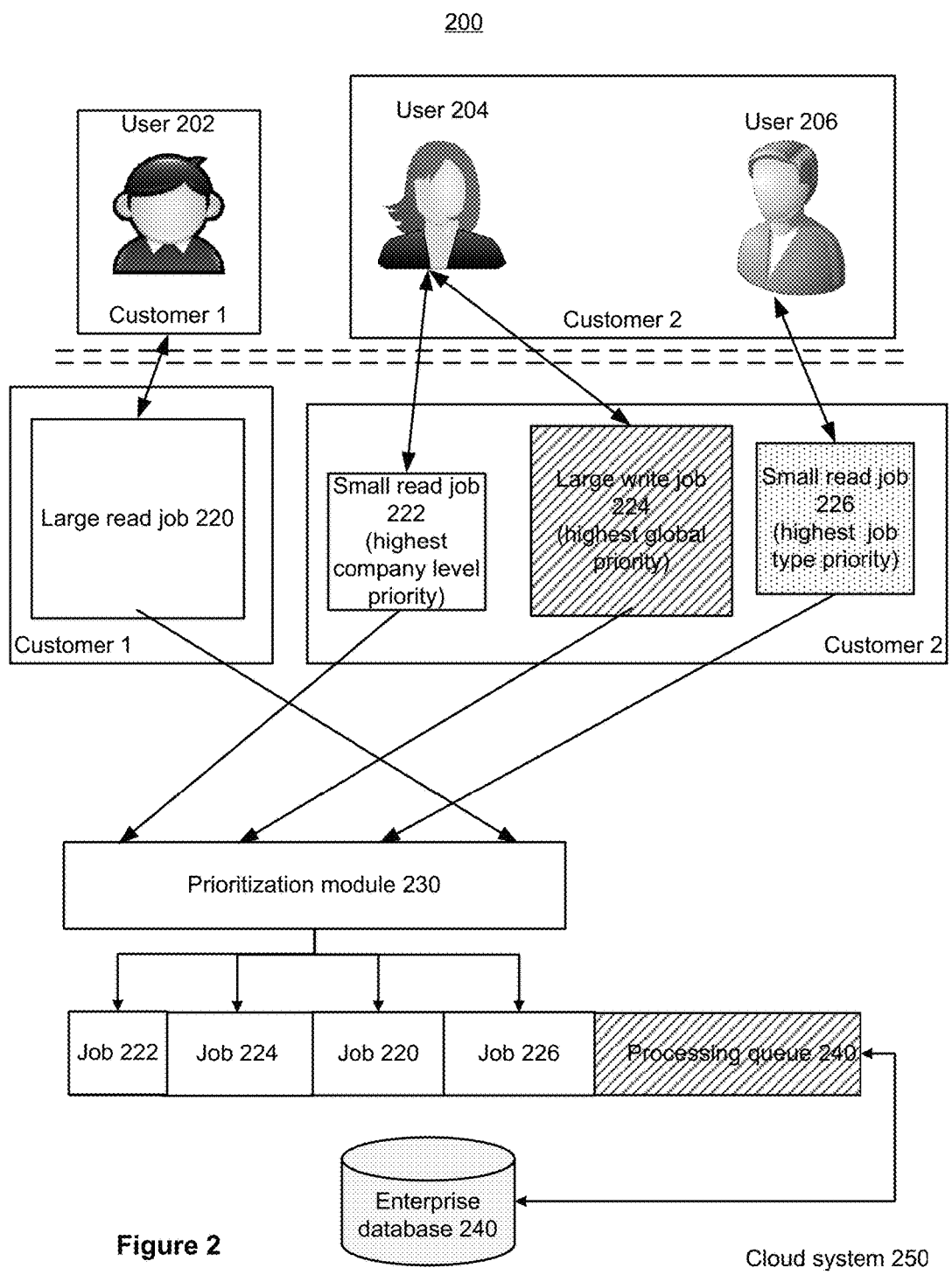
FIG. 2 is an example block diagram illustrating a computing system for prioritizing cloud-based computing tasks in accordance with one embodiment.

FIG. 2 is an example block diagram illustrating a computing system 200 for prioritizing cloud-based computing tasks in accordance with one embodiment.

As shown in FIG. 2, user 202 is associated with cloud customer 1. Both user 204 and user 206 are associated with cloud customer 2. For instance, user 202 is a fraud detection analyst working at company 1. Similarly, user 204 is a compliance expert and user 206 is an auditor working at company 2.

As shown in FIG. 2, user 202 has submitted a large read job 220 to cloud system 250. User 204 has submitted a small read job 222 as well as a large write job 224 to the cloud system 250. User 206 has also submitted a small read job 226 to the cloud system 250. In some cases, the large read job 220, the small read job 222, the large write job 224, and the small read job 226 are service requests, e.g., to read or write data to or from the enterprise database 240 resident on or otherwise communicably connected with the cloud system 250.

As shown in FIG. 2, after receiving the large read job 220, the small read job 222, the large write job 224, and the small read job 226, the prioritization module 230 within the cloud system 250 places these jobs in a processing queue 240 resident on the cloud system 250 to await execution. The prioritization module 230 within the cloud system 250 then prioritizes these jobs for execution in accordance with a global priority, a company level priority, and a job type priority.

For example, after determining the global priority associated with each of these jobs, the prioritization module 230 within the cloud system 250 selects the large write job 224 submitted by the customer 2, because it has the highest global priority among all jobs submitted to the cloud system 250.

Next, after selecting the large write job 224 from the customer 2, the prioritization module 230 within the cloud system 250 examines the company level priorities for all jobs submitted by the customer 2.

Then, in accordance with the company level priority associated with the small read job 222, the large write job 224, and the small read job 226, the prioritization module 230 within the cloud system 250 selects the small read job 222, because it has the highest company level priority among all jobs submitted by the customer 2.

Further, after selecting the small read job 222 from the customer 2, the prioritization module 230 within the cloud system 250 examines the job type (e.g., read or write) priorities for all read jobs submitted by the customer 2. Note that, at this stage, write jobs submitted by the customer 2 are not examined, as they are deemed not having a same job type as a read job.

Lastly, in accordance with the job type priorities associated with the small read job 222 and the small read job 226, the prioritization module 230 within the cloud system 250 selects the small read job 226 for immediate execution, because it has the highest job type priority among all read jobs submitted by the customer 2.

As shown in FIG. 2, after determining the job type priority, the prioritization module 230 within the cloud system 250 places the small read job 226 on the top of the processing queue 240 to receive immediate execution time. Next, the prioritization module 230 begins another round of prioritization of the remaining jobs, such as the large job 220, the small read job 222, the large write job 224, as well as any new incoming jobs.

Figure 3:
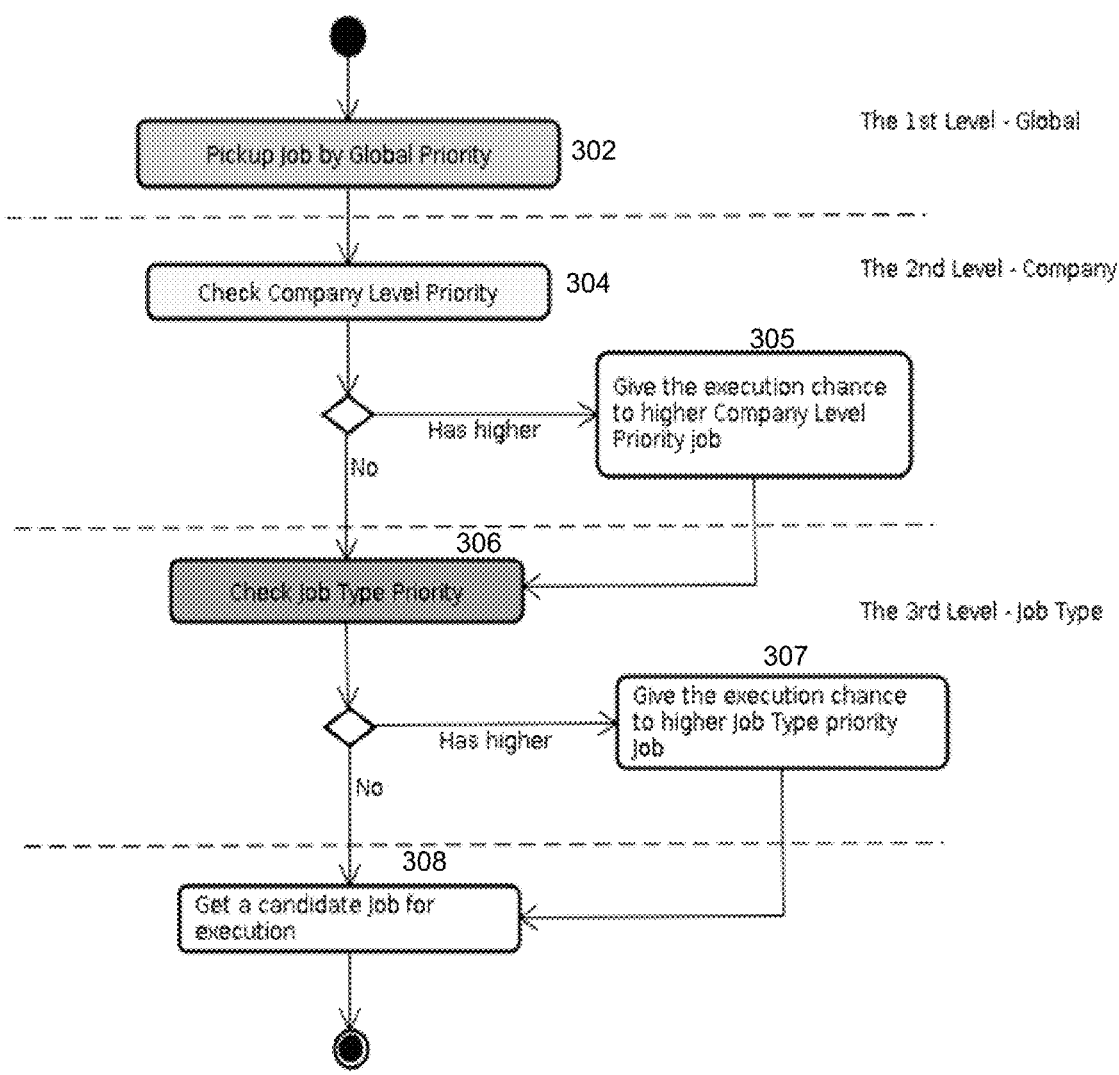
FIG. 3 is an example flow chart illustrating a method for prioritizing cloud-based computing tasks in accordance with one embodiment.

FIG. 3 is an example flow chart illustrating a method 300 for prioritizing cloud-based computing tasks in accordance with one embodiment.

In one embodiment, the method 300 is implemented at a cloud system, e.g., a computer that is equipped with one or more processors and memory storing one or more programs for execution by the one or more processors.

As shown in FIG. 3, in one embodiment, three levels of priorities are used. The first level is a global priority. The second level is a company level priority. And the third level is a job type priority.

In some cases, after receiving a plurality of jobs submitted by several cloud customers, a cloud system examines (302) all jobs in the plurality of jobs in accordance with the global priorities assigned to these jobs.

In one embodiment, the global priorities assigned to these jobs are assigned by an operation team associated with a cloud system where the jobs are being executed or awaiting execution. This is advantageous, as the cloud operation team manages all jobs submitted to a cloud system and therefore carries a more in-depth understanding of which jobs may be more urgent than others, and thus should be assigned, reassigned, or adjusted to higher global priorities. For example, a job from a critical customer may be given a higher global priority to maintain a favorable customer relationship. For another example, a job from a low priority customer may nevertheless be assigned a higher global priority to avoid customer dissatisfaction, because it has been waiting for execution for a prolonged period of time.

In some cases, after selecting a job in accordance with the global priority, the cloud system determines the ownership of that job, e.g., which customer, among a plurality of customers, has submitted the job.

In one embodiment, using the determined job ownership, the cloud system examines (304) all jobs submitted by that customer in accordance with the company level priority.

For example, if the job selected at 302 carries the highest company level priority, it is selected for further consideration based on the job type priority. But if the job selected at 302 does not carry the highest company level priority, it is not selected for further determination based on the job type priority. Instead, another job having the same ownership (e.g., submitted by the same customer), but with a higher company level priority, will be selected for further consideration for execution using the job type priority (305).

This feature is sometimes called "a chance for one is a chance for all" on the customer level. In other words, once a single job from a customer is selected, all jobs from that customer are examined using a company level priority. This is advantageous, as once a customer receives a chance for executing a job, all jobs from that customer are evaluated for execution, thereby giving a fair chance for execution to all jobs submitted by that customer.

In some cases, the company level priorities assigned to all jobs belonging to a customer are assigned by an operation team of a cloud system where the jobs are executed. This is advantageous, as a cloud operation team manages all jobs submitted by a particular customer to the cloud system and therefore has a more comprehensive understanding of each pending job's wait status at the cloud system, and thus may be given higher company level priorities. For example, a critical job from a customer may be given a higher company level priority to ensure the critical job is executed in a timely fashion. For another example, a less critical job from the customer may be assigned a higher company level priority because it has been waiting for execution for a prolonged period of time.

In some cases, after selecting a job in accordance with the company level priority, the cloud system determines the type (e.g., category) of that job, e.g., a read request, a write request, or a hybrid request (e.g., involving both reading and writing data).

In some cases, after determining the job type (whether the job previously selected using the company level priority is a read request, a write request, or a hybrid request), the cloud system examines (306) all jobs submitted by that customer and having the same job type, in accordance with the job type priority.

For example, if the job selected at 306 has the highest job type priority, it is selected for execution, e.g., immediately or after a predefined wait period in a service queue. But if the job selected at 306 does not carry the highest job type priority, it is not selected for execution, e.g., immediately or otherwise. Instead, another job having the same job type and submitted by the same customer, but with a higher job type priority, will be selected (307) for execution and executed (308) by the cloud system (e.g., immediately or otherwise).

This feature is sometimes called "a chance for one is a chance for all" on the job type level. In other words, once a single job having a certain job type from a customer is selected, all jobs having the same job type from that customer are examined using the job type priority.

This is advantageous, as once a certain type of job from a customer receives a chance for execution, all jobs having the same type from the customer are evaluated for execution, thereby providing a fair chance for execution to all jobs having the same type submitted by that customer. This approach provides a fair chance of execution without risking substantial delay to other jobs, because jobs having the same job type are likely to consume approximately the same amount of cloud resource, e.g., computing time and network bandwidth.

In some cases, the job type priorities are assigned, designated, or modified by a cloud customer, sometimes dynamically. For example, a cloud customer may assign a low priority to a read job, but after waiting for 20 seconds, change the priority of that read job to high, so as to speed up execution or avoid a time-out.

This is advantageous, as a cloud customer often has more knowledge (than does a cloud operator) of the jobs it has submitted to a cloud system. For example, a cloud customer may know which type of its jobs are more urgent than others, and thus should be given higher job type priorities. For another example, a massive and thus time-consuming read job (e.g., migrating an enterprise database from one enterprise data server to another enterprise data server) may be initially given a high priority when there are no other jobs awaiting execution, but later adjusted to a lower priority when there is a surge of much smaller scale read jobs (e.g., webpage refreshes), so that other less time-consuming, but otherwise more critical or responsive time sensitive, jobs can proceed and receive execution in a timely fashion.

Figure 4:
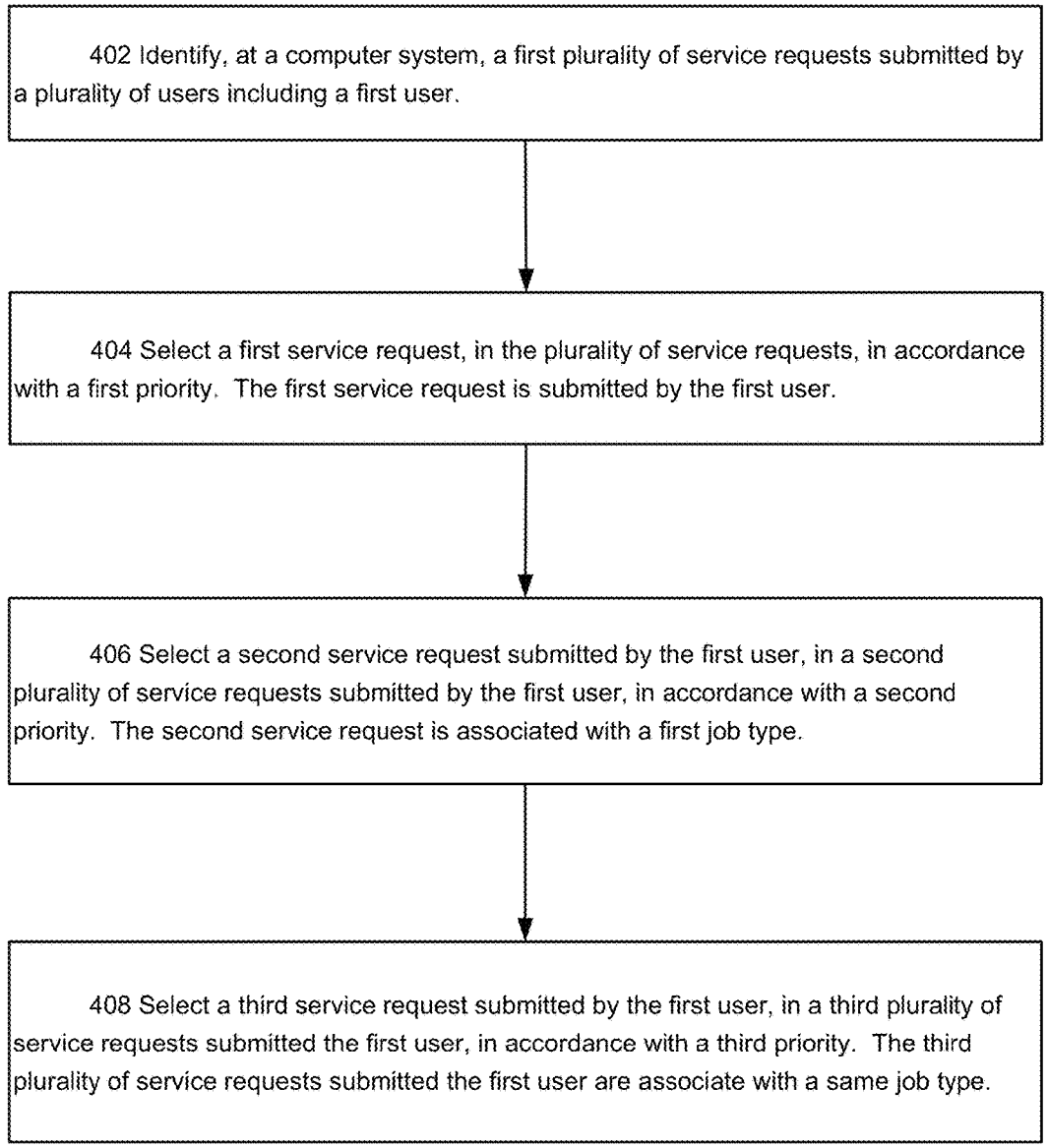
FIG. 4 is an example flow chart illustrating a system for prioritizing cloud-based computing tasks in accordance with one embodiment.

FIG. 4 is an example flow chart illustrating a method 400 for prioritizing cloud-based computing tasks in accordance with one embodiment.

In one embodiment, the method 400 is implemented at a cloud system 106, e.g., a computer that is equipped with one or more processors and memory storing one or more programs for execution by the one or more processors.

In some cases, the method 400 includes, identifying (402) a first plurality of service requests submitted by a plurality of users including a first user. For example, a cloud system may receive a large number of jobs submitted to the cloud system by several cloud customers.

In some cases, the method 400 includes, selecting (404) a first service request, in the plurality of service requests, in accordance with a first priority, where the first service request is submitted by the first user. For example, a cloud system may receive a large number of jobs submitted to the cloud system by several cloud customers, and among these jobs, the cloud system selects one or more jobs using a global priority for further consideration (based on other priories, e.g., a company level priority and a job type priority) for execution.

In one embodiment, the method 400 includes, selecting (406) a second service request submitted by the first user, in a second plurality of service requests submitted by the first user, in accordance with a second priority, where the second service request is associated with a first job type. For example, after selecting a job with highest global priority, the cloud system first determines the job's ownership (e.g., which cloud customer submitted the job) and then identifies a set of jobs having the same ownership (e.g., submitted by the same customer). The cloud system next selects one or more jobs from the set of job in accordance with a company level priority for further consideration (based on one or more other priorities, e.g., a job type priority) for execution.

In one embodiment, the method 400 includes, selecting (408) a third service request submitted by the first user, in a third plurality of service requests submitted the first user, in accordance with a third priority, where the third plurality of service requests submitted the first user are associate with a same job type. For example, after identifying a particular job submitted by a customer using a company level priority, the cloud system selects one or more jobs that are (1) of the same job type as the particular job and (2) submitted by the customer, using a job type priority for consideration for execution.

In one embodiment, the first priority is a global priority. In some cases, each job submitted to a cloud system is assigned a global priority. In one embodiment, a global priority is unique among all jobs submitted to a cloud system. In other words, no two jobs submitted to a cloud system share a same global priority.

In some cases, a global priority is assigned to a job by a cloud operation team or cloud operator. In one embodiment, after being assigned, a global priority is modifiable by a same or different cloud operation team or cloud operator. These approaches are advantageous, as they provide more flexibility to the cloud system in terms of deciding which jobs to take up for execution.

Alternatively, in some other cases, a global priority is assigned to a job by a cloud customer who has submitted the job in the first place. In one embodiment, after being assigned, a global priority is modifiable by a same or different cloud customer.

In one embodiment, the second priority is a company level priority. In some cases, each job submitted to a cloud system is assigned a company level priority. In one embodiment, a company level priority is unique among all jobs submitted to a cloud system. In other words, no two jobs submitted to a cloud system share a same company level priority.

In some cases, a company level priority is assigned to a job by a cloud operation team or cloud operator. In some cases, after being assigned, a company level priority is modifiable by a same or different cloud operation team or cloud operator. These approaches are advantageous, as they provide more flexibility to the cloud system in terms of deciding which customer will receive cloud execution time, either immediately or on an expedited basis. This is particularly helpful to avoid potential customer dissatisfaction, when a customer has been waiting for a prolonged time period.

Alternatively, in some other cases, a company level priority is assigned to a job by a cloud customer, for example, the customer that has submitted the job in the first place. In one embodiment, after being assigned, a company level priority is modifiable by a same or different cloud customer.

In one embodiment, the third priority is a job type priority. In some cases, each job submitted to a cloud system is assigned a job type priority. In some cases, a job type priority is unique among all jobs submitted to a cloud system. In other words, no two jobs submitted to a cloud system share a same job type priority.

In some cases, a job type priority is assigned to a job by a cloud customer, e.g., the customer that has submitted the job in the first place. In some cases, after being assigned, a job type priority is modifiable by a same or different cloud customer. These approaches are advantageous, as they provide more flexibility to cloud customers by enabling them to prioritize their own jobs based on their specific needs.

Alternatively, in some other cases, a job type priority is assigned to a job by a cloud operation team or a cloud operator. In some cases, after being assigned, a job type priority is modifiable by a same or different cloud operation team or cloud operator.

In some cases, the method further comprises executing the third service request, and forgoing executing the second service request and the first service request. For example, the job having the highest job type priority is eventually selected for immediate execution, and other jobs are placed or replaced back into a service queue to await further consideration at a later time.

In some cases, each request in the plurality of service requests is associated with a unique first priority. For example, each job submitted to a cloud system, by a single customer or multiple customers, is assigned a global priority, and no two jobs submitted to the cloud system is assigned a same global priority. This ensures that a prioritization based on the global priority can always provide a single candidate job (and thus a single candidate customer) for further considerations.

In some cases, each request in the second plurality of service requests is associated with a unique second priority. For example, each job submitted by a particular customer is assigned a company level priority, and no two jobs submitted by a same customer is assigned a same company level priority. This ensures that a prioritization based on the company level priority can always provide a single candidate job (and thus a single candidate job type) for further considerations.

In one embodiment, each request in the third plurality of service requests is associated with a unique third priority. For example, each job having a same job type submitted by a particular customer is assigned a job type priority, and no two jobs having the same job type submitted by a same customer is assigned a same job type priority. This ensures that a prioritization based on the job type priority can always provide a single candidate job (a winner) for immediate execution by the cloud system, to avoid cloud resource idling.

In some cases, the first service request is a different request from the second service quest. For example, a job selected using the global priority may or may not be the same job selected using the company level priority. This ensures that all jobs submitted by a particular customer are considered for execution, once one of the jobs submitted by that particular customer is selected using global priority.

In one embodiment, the first service request is a different request from the third service quest. For example, a job selected using the global priority may or may not be the same job eventually selected for execution using the job type priority standard. This ensures that all jobs having a same job type submitted by a particular customer are considered for execution, once one of the jobs submitted by that particular customer is selected using global priority.

In some cases, the second service request is a different request from the third service quest. For example, the job selected using the company level priority may or may be the same job eventually selected for execution using the job type priority standard. This ensures that all jobs having a particular job type submitted by a particular customer are considered for execution, once one of the jobs having the same job type and submitted by that particular customer is selected using company level priority.

In one embodiment, the first priority and the second priority are determined by an operator of the computing system. For example, the global priority and the company level priority are determined and modifiable dynamically by a cloud operation team or a cloud operator.

In some cases, the third priority is determined by a customer of the computing system. For example, the job type priority is determined and modifiable dynamically by a cloud customer.

In one embodiment, the computer system is a multi-tenancy cloud system. In some cases, the computer system serves the plurality of users or customers. In one embodiment, the computer system is part of a computing cloud.

In one embodiment, the first service request is a request to access an enterprise database associated with the computer system. For example, a job submitted to the cloud system is a request to access an enterprise database resident on or communicably connected with the cloud system.

In one embodiment, the first priority and the second priority are assigned by a first entity, the third priority is assigned by a second entity, and the first entity is different from the second entity. For example, the first priority and the second priority are determined by an operator of the computing system, and the third priority is determined by a customer of the computing system. This hybrid priority control—by not only a cloud operator, but also a cloud customer—is advantageous, as operation discretions are provided both cloud operation teams and cloud customers. By these ways, both cloud operation teams and cloud customers can prioritize jobs submitted to a cloud system based on their own needs (e.g., customer relationship and processing priority respectively), thereby providing more flexibility in terms of allocating cloud resource to a large number of jobs.

In one embodiment, the computer system is a mobile computing device, and the first data request and the second data request are issued by a mobile application resident on the mobile computing device. For example, the device 102 is a mobile device, such as a smart phone, a smart watch, a tablet, or a laptop, and the data request are issued by a mobile application on the mobile device.

Figure 5:
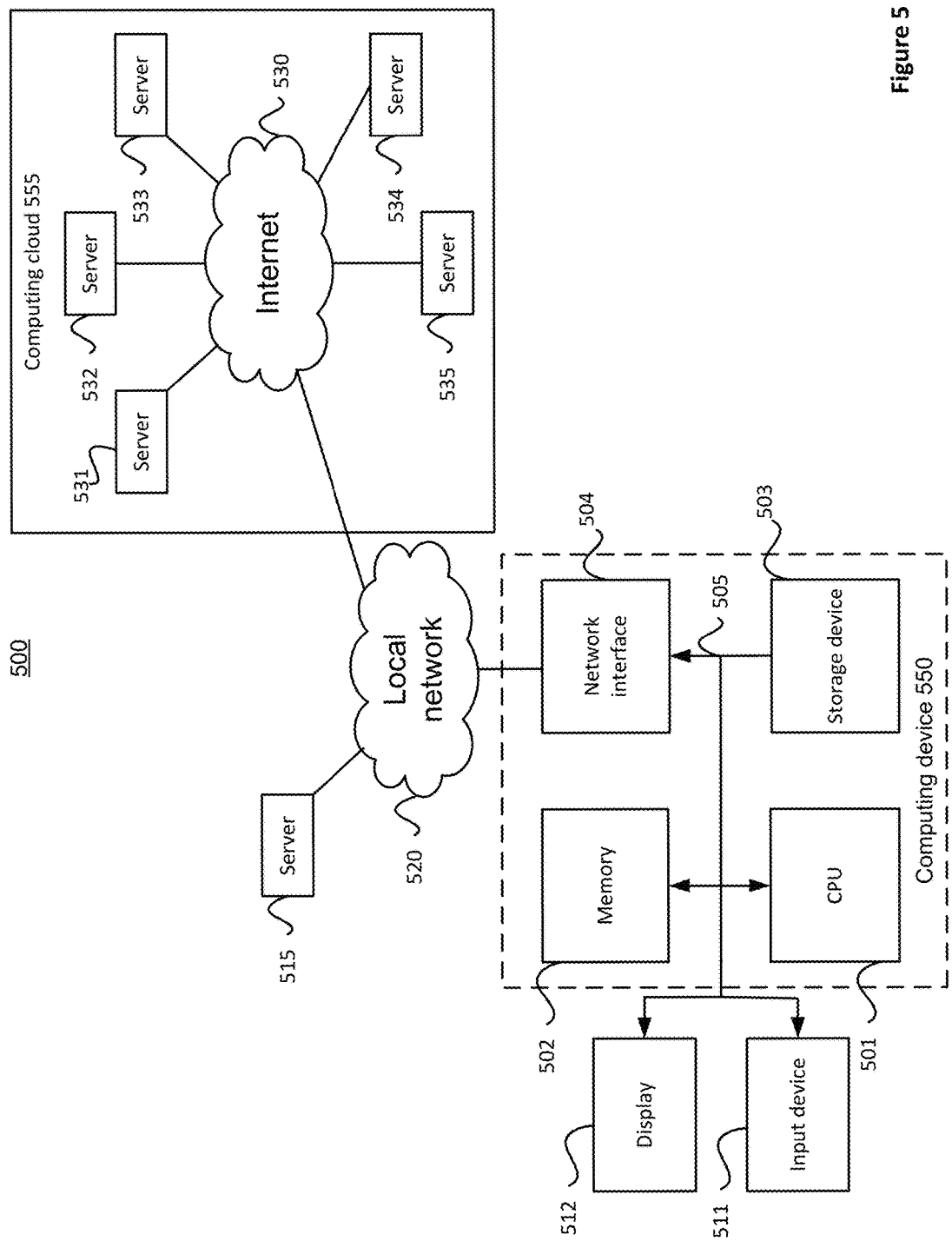
FIG. 5 is an example block diagram illustrating a computing system for prioritizing cloud-based computing tasks in accordance with one embodiment.

FIG. 5 is an example block diagram illustrating an example computing system 500 for prioritizing cloud-based computing tasks in accordance with one embodiment.

As shown in FIG. 5, in one embodiment, the computing device 550 includes a bus 505 or other communication mechanism for communicating information, and a processor 501 coupled with the bus 505 for processing information. In one embodiment, the computing device 550 also includes a memory 502 coupled to bus 505 for storing information and instructions to be executed by processor 501 (CPU), including information and instructions for performing the techniques described above, for example. In one embodiment, the memory 502 may also be used for storing variables or other intermediate information during execution of instructions to be executed by the processor 501. In one embodiment, the memory 502 includes, but is not limited to, random access memory (RAM), read only memory (ROM), or both. A storage device 503 is also provided for storing information and instructions. Common forms of storage devices include, for example, a hard drive, a magnetic disk, an optical disk, a CD-ROM, a DVD, a flash memory, a USB memory card, or any other medium from which a computing system can obtain information. In one embodiment, the storage device 503 may include source code, binary code, or software files for performing the techniques above, for example. The storage device 503 and the memory 502 are both examples of computer readable mediums.

In one embodiment, the computing device 550 may be coupled via the bus 505 to a display 512, such as a cathode ray tube (CRT) or liquid crystal display (LCD), for displaying information to a user. An input device 511 such as a keyboard and/or mouse is coupled to the bus 505 for communicating information and command selections from the user to the processor 501. The combination of these components allows the user to communicate with the computing device 550. In some systems, the bus 505 may be divided into multiple specialized buses.

In one embodiment, the computing device 550 includes a network interface 504 coupled with the bus 505. In one embodiment, the network interface 504 provides two-way data communications between the computing device 550 and the local network 520. In one embodiment, the network interface 504 includes a digital subscriber line (DSL) or a modem to provide data communication connection over a telephone line, for example. Another example of the network interface 504 is a local area network (LAN) card to provide a data communication connection to a compatible LAN. Wireless links are another example. In any such implementation, the network interface 504 sends and receives electrical, electromagnetic, or optical signals that carry digital data streams representing various types of information.

In one embodiment, the computing device 550 sends and receives information, including messages or other interface actions, through the network interface 504 across a local network 520, an Intranet, or the Internet 530. In one embodiment, the local network, the computing device 550 communicates with a plurality of other computer machines, such as a server 515 or a computing cloud 555. In one embodiment, the computing device 550 and server computer systems represented by the server 515 form a cloud computing network, which may be programmed with processes described herein. In the Internet example, software components or services may reside on multiple different computing systems 510 or servers 531-535 across the network. In one embodiment, the processes described above are implemented at computing cloud 555, which includes one or more servers from the servers 531-535. In one embodiment, the server 531 transmits actions or messages from one component, through the Internet 530, the local network 520, and the network interface 504 to a component of the computing device 550. In one embodiment, the software components and processes described above are implemented on any computer system and send and/or receive information across a network.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the implementation(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the implementation(s).

It will also be understood that, although the terms "first," "second," etc. may be used herein to describe various elements, these elements should not be limited by these terms. These terms are only used to distinguish one element from another. For example, a first computing task could be termed a second job, and, similarly, a second computing task could be termed a first computing task, without changing the meaning of the description, so long as all occurrences of the "first computing task" are renamed consistently and all occurrences of the "second computing task" are renamed consistently. The first computing task and the second computing task are both computing tasks, but they are not the computing task.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and computing machine program products that embody illustrative implementations. For purposes of explanation, numerous specific details were set forth in order to provide an understanding of various implementations of the inventive subject matter. It will be evident, however, to those skilled in the art that implementations of the inventive subject matter may be practiced without these specific details. In general, well-known instruction instances, protocols, structures and techniques have not been shown in detail.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A method to prioritize execution of service requests from a plurality of tenants performed by a computer system in a cloud computing system, wherein the execution of the service requests are prioritized according to at least three priority levels, wherein the at least three priority levels include a first priority level, a second priority level, and a third priority level, the method comprising:
receiving, by the computer system having one or more processors and a memory storing one or more programs for execution by the one or more processors, a first plurality of service requests submitted by a set of tenants of the plurality of tenants, wherein each service request is assigned a different one of a plurality of first priorities at the first priority level, a different one of a plurality of second priorities at the second priority level, and a different one of a plurality of third priorities at the third priority level such that no two service requests share the same first priorities, the same second priorities, or the same third priorities;
determining the first priority, the second priority and the third priority assigned to a first service request in the first plurality of service requests;
selecting the first service request in the first plurality of service requests if the first service request has a highest first priority within the first priority level;
determining a tenant in the set of tenants that submitted the first service request with the highest first priority within the first priority level;
identifying a second plurality of service requests comprising a subset of the first plurality of service requests that are submitted by the determined tenant;
selecting a second service request in the second plurality of service requests having a highest second priority within the second priority level;
determining a job type associated with the second service request;
identifying a third plurality of service requests comprising a subset of the second plurality of service having the determined job type;
selecting a third service request in the third plurality of service requests having a highest third priority within the third priority level; and
executing the selected third service request in the cloud computing system.

2. The method of claim 1, wherein the first priority level and the second priority level are assigned by a first user of the cloud computing system, and the third priority is assigned by a second user different from the first user of the cloud computing system.

3. The method of claim 1, wherein the third service request and the second service request are the same service request.

4. The method of claim 1, wherein the second service request and the first service request are the same service request.

5. The method of claim 1, wherein the third service request and the first service request are the same service request.

6. The method of claim 1, wherein the first service request is a request to access an enterprise database associated with the computer system.

7. The method of claim 1, wherein the first plurality of service requests comprises a first set of service requests submitted by a first user associated with the tenant in the set of tenants and a second set of service requests submitted by a second user associated with the tenant in the set of tenants.

8. A non-transitory computer readable storage medium storing one or more computer programs, which when executed by a computer system, cause the computer system to perform operations in a cloud computing system configured to prioritize execution of service requests from a plurality of tenants according to at least three priority levels, wherein the at least three priority levels include a first priority level, a second priority level, and a third priority level, the operations comprising:
receiving, by the computer system having one or more processors and a memory storing one or more programs for execution by the one or more processors, a first plurality of service requests submitted by a set of tenants of the plurality of tenants of, wherein each service request is assigned a different one of a plurality of first priorities at the first priority level, a different one of a plurality of second priorities at the second priority level, and a different one of a plurality of third priorities at the third priority level such that no two service requests share the same first priorities, the same second priorities, or the same third priorities;
determining the first priority, the second priority and the third priority assigned to a first service request in the first plurality of service requests;
selecting the first service request in the first plurality of service requests if the first service request has a highest first priority within the first priority level;
determining a tenant in the set of tenants that submitted the first service request with the highest first priority within the first priority level;
identifying a second plurality of service requests comprising a subset of the first plurality of service requests that are submitted by the determined tenant;
selecting a second service request in the second plurality of service requests having a highest second priority within the second priority level;
determining a job type associated with the second service request;
identifying a third plurality of service requests comprising a subset of the second plurality of service having the determined job type;
selecting a third service request in the third plurality of service requests having a highest third priority within the third priority level; and executing the selected third service request in the cloud computing system.

9. The non-transitory computer readable storage medium of claim 8, wherein the first priority level and the second priority level are assigned by a first user of the cloud computing system, and the third priority is assigned by a second user different from the first user of the cloud computing system.

10. The non-transitory computer readable storage medium of claim 8, wherein the first plurality of service requests comprises a first set of service requests submitted by a first user associated with the tenant in the set of tenants and a second set of service requests submitted by a second user associated with the tenant in the set of tenants.

11. A computer system comprising:
one or more processors; and
memory storing one or more computer programs configured to be executed by the one or more processors, the one or more computer programs including instructions for performing operations in a cloud computing system configured to prioritize execution of service requests from a plurality of tenants according to a hierarchy of priority levels comprising at least three priority levels, wherein the at least three priority levels include a first priority level, a second priority level, and a third priority level, the operations comprising:
receiving, by the computer system having one or more processors and a memory storing one or more programs for execution by the one or more processors, a first plurality of service requests submitted by a set of tenants of the plurality of tenants, wherein each service request is assigned a different one of a plurality of first priorities at the first priority level, a different one of a plurality of second priorities at the second priority level, and a different one of a plurality of third priorities at the third priority level such that no two service requests share the same first priorities, the same second priorities, or the same third priorities;

determining the first priority, the second priority and the third priority assigned to a first service request in the first plurality of service requests;
selecting the first service request in the first plurality of service requests if the first service request has a highest first priority within the first priority level;
determining a tenant in the set of tenants that submitted the first service request with the highest first priority within the first priority level;
identifying a second plurality of service requests comprising a subset of the first plurality of service requests that are submitted by the determined tenant;
selecting a second service request in the second plurality of service requests having a highest second priority within the second priority level;
determining a job type associated with the second service request;
identifying a third plurality of service requests comprising a subset of the second plurality of service having the determined job type;
selecting a third service request in the third plurality of service requests having a highest third priority within the third priority level; and
executing the selected third service request in the cloud computing system.

12. The computer system of claim 11, wherein the first priority level and the second priority level are assigned by a first user of the cloud computing system, and the third priority is assigned by a second user different from the first user of the cloud computing system.

13. The computer system of claim 11, wherein the first plurality of service requests comprises a first set of service requests submitted by a first user associated with the tenant in the set of tenants and a second set of service requests submitted by a second user associated with the tenant in the set of tenants.

* * * * *